(12) United States Patent
Klatt (10) Patent No.: US 10,531,411 B2
(45) Date of Patent: Jan. 7, 2020

(54) IMPROVING OR ENABLING RADIO COVERAGE FOR A USER EQUIPMENT WITH RESPECT TO A MOBILE COMMUNICATION NETWORK

(71) Applicant: Deutsche Telekom AG, Bonn (DE)

(72) Inventor: Axel Klatt, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 10 days.

(21) Appl. No.: 15/309,210

(22) PCT Filed: May 4, 2015

(86) PCT No.: PCT/EP2015/059755
§ 371 (c)(1),
(2) Date: Nov. 7, 2016

(87) PCT Pub. No.: WO2015/169768
PCT Pub. Date: Nov. 12, 2015

(65) Prior Publication Data
US 2017/0086156 A1 Mar. 23, 2017

(30) Foreign Application Priority Data
May 9, 2014 (EP) ..................................... 14167758

(51) Int. Cl.
*H04W 56/00* (2009.01)
*H04W 76/14* (2018.01)
(Continued)

(52) U.S. Cl.
CPC ......... *H04W 56/001* (2013.01); *H04W 8/005* (2013.01); *H04W 76/14* (2018.02); *H04W 88/04* (2013.01)

(58) Field of Classification Search
None
See application file for complete search history.

(56) References Cited

U.S. PATENT DOCUMENTS

2006/0239333 A1 10/2006 Albert et al.
2014/0112194 A1 4/2014 Novlan et al.
(Continued)

FOREIGN PATENT DOCUMENTS

JP 2011176549 A 9/2011

OTHER PUBLICATIONS

Intel Corporation: "On D2D Discovery Transmission Timing", 3GPP Draft; R1-135955-Intel-Discovery Transmission Timing, 3$^{rd}$ Generation Partnership Project (3GPP), Mobile Competence Centre; 650, Route Des Lucioles; F-06921 Sophia-Antipolis Cedex; France, vol. RAN WG1, no. San Francisco, USA; Nov. 11, 2013-Nov. 15, 2013 Nov. 13, 2013 (Nov. 13, 2013), XP050735533.
(Continued)

*Primary Examiner* — Hicham B Foud
(74) *Attorney, Agent, or Firm* — Leydig, Voit & Mayer, Ltd.

(57) ABSTRACT

A method is provided for improving or enabling radio coverage for a user equipment enabled to use a device to device communication mode (D2D mode) but out of direct radio coverage of a base station entity of a mobile communication network. In a first step, the user equipment transmits a first discovery signal to a relay user equipment, the first discovery signal comprising at least one of a time limitation with respect to a discovery time interval and a synchronization indication. In a second step, the relay user equipment applies, upon reception of the first discovery signal from the user equipment, reception capabilities during a first reception time interval, the first reception time interval comprising and exceeding the discovery time interval in time, wherein the first reception time interval is dependent on at least one of the time limitation and the synchronization indication of the first discovery signal.

7 Claims, 2 Drawing Sheets

(51) Int. Cl.
*H04W 8/00* (2009.01)
*H04W 88/04* (2009.01)

(56) References Cited

U.S. PATENT DOCUMENTS

| | | | |
|---|---|---|---|
| 2015/0043448 A1* | 2/2015 | Chatterjee | H04W 8/005 |
| | | | 370/329 |
| 2015/0223141 A1* | 8/2015 | Chatterjee | H04W 40/246 |
| | | | 370/329 |
| 2016/0100401 A1* | 4/2016 | Xiong | H04W 76/10 |
| | | | 455/450 |
| 2016/0198329 A1* | 7/2016 | Lee | H04W 8/005 |
| | | | 455/434 |
| 2016/0219541 A1* | 7/2016 | Chatterjee | H04W 76/18 |
| 2017/0006652 A1* | 1/2017 | Lee | H04W 72/08 |
| 2017/0013575 A1* | 1/2017 | Jung | H04W 56/002 |
| 2018/0020459 A1* | 1/2018 | Chatterjee | H04W 76/18 |

OTHER PUBLICATIONS

"3$^{rd}$ Generation Partnership Project; Technical Specification Group Radio Access Network; Study on LTE Device to Device Proximity Services; Radio Aspects (Release 12)", 3GPP Standard; 3GPP TR 36.843, 3$^{rd}$ Generation Pratnership Project (3GPP), Mobile Competence Centre; 650, Route Des Lucioles; F-06921 Sophia-Antipolis Cedex; France, vol. RAN WG1, No. V1.2.0, Mar. 10, 2014 (Mar. 10, 2014), pp. 1-49, XP050769670.
3GPP TSG-RAN WG2 #85 Bis; R2-141859, pp. 1-13, Mar. 31-Apr. 4, 2014.

* cited by examiner

IMPROVING OR ENABLING RADIO COVERAGE FOR A USER EQUIPMENT WITH RESPECT TO A MOBILE COMMUNICATION NETWORK

CROSS-REFERENCE TO RELATED APPLICATIONS

This application is a U.S. National Phase application under 35 U.S.C. § 371 of International Application No. PCT/EP2015/059755, filed on May 4, 2015, and claims benefit to European Patent Application No. EP 14167758.3, filed on May 9, 2014. The International Application was published in English on Nov. 12, 2015 as WO 2015/169768 A1 under PCT Article 21(2).

FIELD

The present invention relates a method for improving or enabling radio coverage for a user equipment with respect to a mobile communication network.

Furthermore, the present invention relates to a user equipment adapted for having an improved radio coverage, and to a relay user equipment adapted for providing an improved radio coverage to a user equipment.

Additionally, the present invention relates to a system for improving or enabling radio coverage for a user equipment, and to a mobile communication network for use with exemplary embodiments of the invention.

Furthermore, the present invention relates to a program and to a computer program product for improving or enabling radio coverage for a user equipment with respect to a mobile communication network.

The present invention addresses, inter alia, a method allowing at least two mobile terminal devices (or user equipments) that are capable of establishing a direct communication link between these devices (or user equipments)—hereinafter called device-to-device communication or device to device communication or D2D communication—to discover each other, i.e. initially exchange information directly between these devices.

BACKGROUND

It is expected that the LTE (Long Term Evolution) system will allow an increased usage of device to device communication. The LTE system and LTE-A (LTE Advanced) system comprises the Evolved Universal Mobile Telecommunications System (UMTS) Terrestrial Radio Access Network (E-UTRAN), and the Evolved Packet Core (EPC). The E-UTRAN typically comprises a plurality of base station entities, typically referred to as eNBs (evolved NodeBs) for macro-cells and HeNBs (Home-eNBs) for femto-cells, as well as the cellular terminals (or user equipments).

Device to device communication, especially for the usage for critical communication in public safety is currently being defined as a work item in the context of 3GPP (Third Generation Partnership Project), Release 12. In this context, one goal is to allow a replacement of the TETRA system, which is widely used for critical communication today, with current radio technology based on LTE (Long Term Evolution).

In order to fulfil the requirements of the public safety authorities, at least voice communication has to be supported in such a system. In a later step, all kinds of multimedia based communication should be provided for such critical communication.

The basic principle of LTE device to device communication (LTE D2D) is the possibility to allow a direct communication between at least two devices (or user equipments) supporting a device to device communication mode. Within the context of the device to device communication, standardized in 3GPP, two modes are part of the 3GPP definitions: an infrastructure-based device to device communication mode and a direct device to device communication mode.

A further feature of the device to device communication is the so-called "discovery" functionality which allows at least two device-to-device-communication-enabled devices (or user equipments) to identify each other if these devices (or user equipments) are in the vicinity of each other.

The discovery feature is of interest to the critical communication users as well as of interest to commercial cellular mobile operators in order to explore new business opportunities with targeted mobile advertising as well as supporting the growing trend of social networking where the environment of the current location of the user equipment (i.e. the proximity of the current location) plays a more and more important role. Additionally, device to device communications, and especially proximity services, are likewise interesting for automotive applications in order to establish new services, e.g., for car-to-car communication, traffic management and traffic alert.

The successful execution of the discovery procedure between two user equipments typically necessitates the use of a correct (or coherent) time base (or an indication of a common timing) of the two user equipments that are located in proximity to each other. Such a coherent information about the time base is difficult to maintain in case that one of the two user equipments is out of radio coverage of the respective base station entity of the mobile communication network, and this coherent information about the time base deteriorates the longer the one user equipment without radio network coverage is without radio coverage. This might lead to situations where no successful execution of the discovery procedure is possible between two user equipments.

SUMMARY

In an embodiment, the present invention provides a method for improving or enabling radio coverage for a user equipment with respect to a mobile communication network, wherein the mobile communication network comprises a core network and an access network, wherein the access network of the telecommunications network comprises a base station entity, wherein the user equipment is enabled to use a device to device communication mode (D2D mode), wherein a relay user equipment is also enabled to use a D2D mode, wherein the base station entity transmits a timing information related to a master timing schedule relevant for any user equipment being served by the base station entity, wherein the base station entity furthermore transmits an indication related to a discovery time interval, the discovery time interval being used for discovery signals exchanged between user equipments using the D2D communication mode, wherein the relay user equipment is connected to the base station entity, and wherein the user equipment at a first point in time was connected to the base station entity or to another base station entity of the access network of the mobile communication network, and, at a second, subsequent point in time, is out of direct radio coverage of the base station entity. The method comprises: (1) the following first and second steps, or (2) the following third step: in the first step, the user equipment transmits a first discovery signal to the relay user equipment, the first discovery signal comprising a time limitation with respect to the discovery time interval and/or comprising a synchronization indication, the synchronization indication being related to an estimated timer deviation of a timer within the user equipment with respect to the master timing schedule of the base station entity; and in the second step, subsequent to the first step, the relay user equipment, upon reception of the first discovery signal from the user equipment, applies reception capabilities during a first reception time interval, the first reception time interval comprising and exceeding the discovery time interval in time, wherein the first reception time interval is dependent on the time limitation and/or the synchronization indication of the first discovery signal; or in the third step the relay user equipment transmits a second discovery signal to the user equipment, the second discovery signal indicating the master timing schedule of the base station entity to the user equipment, and the user equipment applies reception capabilities during a second reception time interval, the second reception time interval comprising and exceeding the discovery time interval in time, wherein the second reception time interval is related to an estimated timer deviation of a timer within the user equipment with respect to the master timing schedule of the base station entity.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide a technically simple and effective solution to allow the successful execution of discovery procedures (i.e. the exchange of information in order to discover each other) between (at least) two device-to-device-communication-capable (or enabled) devices (or user equipments), one device (or user equipment)—hereinafter called relay user equipment—having radio network coverage while the other of the (at least) two devices (or user equipments) is out-of-network coverage.

In an embodiment, the present invention provides a method for improving or enabling radio coverage for a user equipment with respect to a mobile communication network, wherein the mobile communication network comprises a core network and an access network, wherein the access network of the telecommunications network comprises a base station entity, wherein the user equipment is enabled to use a device to device communication mode (D2D mode), wherein a relay user equipment is likewise enabled to use device to device communication mode, wherein the base station entity transmits a timing information related to a master timing schedule relevant for any user equipment being served by the base station entity, wherein the base station entity furthermore transmits an indication related to a discovery time interval, the discovery time interval being used for discovery signals exchanged between user equipments being enabled to use the device to device communication mode and using the device to device communication mode, wherein in case that the relay user equipment is connected to the base station entity, and in case that the user equipment—at a given point in time—has been connected to the base station entity or to another base station entity of the access network of the mobile communication network but is out of direct radio coverage with the base station entity at a further point in time, the further point in time being subsequent to the given point in time, the method comprising at least either the following first and second step or the following third step:

in the first step, the user equipment transmits a first discovery signal, the first discovery signal being received by the relay user equipment and the first discovery signal comprising a time limitation with respect to the discovery time interval, and/or comprising a synchronization indication, the synchronization indication being related to an estimated timer deviation of a timer within the user equipment with respect to the master timing schedule of the base station entity, in the second step, subsequent to the first step, the relay user equipment—upon reception of the first discovery signal from the user equipment—applies reception capabilities during a first reception time interval, the first reception time interval comprising but exceeding the discovery time interval in time, wherein the first reception time interval is dependent on the time limitation and/or the synchronization indication of the first discovery signal, in the third step the relay user equipment transmits a second discovery signal, the second discovery signal indicating the master timing schedule of the base station entity to the user equipment, and the user equipment applies reception capabilities during a second reception time interval, the second reception time interval comprising but exceeding the discovery time interval in time, wherein the second reception time interval is related to an estimated timer deviation of a timer within the user equipment with respect to the master timing schedule of the base station entity.

The present invention addresses, inter alia, a method allowing at least two mobile terminal devices (or user equipments) that are capable of establishing a direct communication link between these devices (or user equipments) to discover each other based on in-coverage methods carried out when one of the two devices (or user equipments) is not operating under radio coverage of a public land mobile network (or mobile communication network), i.e. under radio coverage of a base station entity of the public land mobile network (or mobile communication network).

Embodiments of the present invention allow for a continuation of discovery similar to the in-coverage case (i.e. where both user equipments discovering each other have radio network coverage) and also for the above mentioned case of one user equipment having lost radio coverage, i.e. being out of radio network coverage. Embodiments of the present invention also provide a fall back option in case that such information for discovery from in-coverage is not available.

Embodiments of the present invention allow a device-to device-communication-enabled user equipment (or device) to apply principles for in-coverage discovery in situations where the user equipment is out of radio coverage of a corresponding base station entity of either the corresponding public land mobile network (or mobile communication network) or out of radio coverage of a base station entity of any public land mobile network (or mobile communication network).

Embodiments of the present invention are applicable, for example, but not limited to, for usage in Public Safety device to device communication, where one device (or user equipment) of two devices (or user equipments) is out of radio coverage of a respective base station entity and requires to detect another device (or user equipment) which is probably under radio coverage of the respective base station entity of the mobile communication network (or public land mobile network).

In the in-coverage case, i.e. in case that both user equipments are under radio network coverage, the 3GPP standard, in principle, agreed on two methods of discovery. One is referred to as "scheduled discovery" where the user equipment which wants to be discovered asks the network for provision of resources for transmission of its discovery message. In turn, on receiving the request message for discovery, the controlling radio access network of the mobile communication network (or public land mobile network) assigns resources to the terminal (or user equipment) on which resources this terminal is allowed to transmit the discovery message. An alternative discovery method is defined as "contention based" discovery, where the controlling radio access network of the mobile communication network (or public land mobile network) assigns discovery message resources by sending configuration information on a control channel, typically a broadcast control channel (BCCH), to a plurality of terminals or to all terminals within a respective radio cell (or even to a plurality of terminals or to all terminals in a plurality of radio cells) that are capable of performing device to device communication discovery. Those terminals or user equipments that are interested in establishing a device to device communication link to another terminal or user equipment can choose a transmission resource from the pool of configured resources (i.e. the air interface resources indicated via a transmission of control information (typically by using system information blocks (SIBs)) on the control channel of one or a plurality of radio cells) and transmit their own discovery message. The slight drawback of this approach is—as the configured air interface resources constitute a shared medium—the potential collision in case of multiple terminals choosing the same (or the same part of the) discovery transmission air interface resources. In this case, a collision cannot be avoided by using this approach.

While these two approaches (for discovery procedures) are straightforward in case that both devices enabled for device to device communication are operated under network coverage, the situation is different if the transmitting device (or user equipment) (i.e. the user equipment that seeks to establish a direct communication link to another device to device communication enabled device and, in consequence, initiates the discovery procedure) is not under network coverage as such a device to device communication enabled device is neither able to read the transmission resources form the broadcast control channel (BCCH), nor to ask the radio network (i.e. the respective base station entity of the radio access network) for dedicated discovery transmission resources (i.e. using the above mentioned scheduled discovery method).

According to the present invention, it is advantageously possible that even in situations where one device to device communication enabled device (or user equipment) is out of coverage with the radio network, it is possible to successfully perform a discovery procedure, even a discovery procedure that is initiated (i.e. by (initially) sending discovery information) by the device to device communication enabled device that is out of coverage with the radio network. Thus, it is advantageously possible according to the present invention that even user equipments that are out of coverage can be detected by other device to device communication enabled devices.

In the context of the present invention, device to device communication and especially the execution of discovery procedures between device to device communication enabled devices (or user equipments) is exemplarily explained using the use case of a public safety application. However, the present invention is in no way limited or restricted to this example, and other applications, such as proximity-related business use cases (e.g. advertising) or use cases involving the use or the participation of social networks are likewise related to the present invention.

Typically for the public safety use case, it can be assumed that the public safety communication is, in the typical situation, assisted by the presence of a mobile communication network (or a public land mobile network), being it a dedicated mobile communication network (or dedicated public land mobile network) for public safety communications or applications (e.g. FirstNet in the United States of America for the communication of the emergency services like the police or firemen) or being it commercial mobile communication networks (or public land mobile networks) which offer services to the public safety users.

According to the present invention, two user equipments are enabled to use a device to device communication mode (D2D mode), are subscribers of a mobile communication network (or public land mobile network) and are connected to a base station entity of the access network of the mobile communication network. The base station entity transmits
    a timing information related to a master timing schedule relevant for any user equipment being served by the base station entity, and
    an indication related to a discovery time interval, the discovery time interval being used for discovery signals exchanged between user equipments being enabled to use the device to device communication mode and using the device to device communication mode. In case that both user equipments are connected to the mobile communication network, i.e. they have radio coverage with the base station entity, sufficient time coherence with regard to the master timing schedule is assured due to the timing information. However, in case than only one user equipment of the two user equipments (the relay user equipment) is connected to the mobile communication network, and the other of the two user equipments has lost radio coverage, then the situation occurs that the relay user equipment is (still) connected to the base station entity, and the (other) user equipment—at a given point in time—has been connected to the base station entity or to another base station entity of the access network of the mobile communication network but is out of direct radio coverage with the base station entity at a subsequent further point in time. In such a situation, it is advantageously possible according to the present invention that the successful execution of a discovery procedure between the relay user equipment and the user equipment is still possible, despite the fact that the user equipment has lost radio coverage with the base station entity. According to the present invention, the behaviour of the relay user equipment and of the user equipment is modified such that the likelihood of a successful discovery procedure being performed can be enhanced via either the following first and/or second steps—in case that the discovery procedure is initiated by the user equipment—or via the following third step—in case that the discovery procedure is initiated by the relay user equipment:

in the first step, the user equipment transmits a first discovery signal, the first discovery signal being received by the relay user equipment and the first discovery signal
   comprising a time limitation with respect to the discovery time interval, and/or
   comprising a synchronization indication, the synchronization indication being related to an estimated timer deviation of a timer within the user equipment with respect to the master timing schedule of the base station entity, in the second step, subsequent to the first step, the relay user equipment—upon reception of the first discovery signal from the user equipment—applies reception capabilities during a first reception time interval, the first reception time interval comprising but exceeding the discovery time interval in time, wherein the first reception time interval is dependent on the time limitation and/or the synchronization indication of the first discovery signal, in the third step the relay user equipment transmits a second discovery signal, the second discovery signal indicating the master timing schedule of the base station entity to the user equipment, and the user equipment applies reception capabilities during a second reception time interval, the second reception time interval comprising but exceeding the discovery time interval in time, wherein the second reception time interval is related to an estimated timer deviation of a timer within the user equipment with respect to the master timing schedule of the base station entity.

In case that the discovery procedure is initiated by the user equipment (not having radio coverage), in the first step, measures are taken by the user equipment that the discovery procedure can be initiated, and in the second step, the relay user equipment adapts its behaviour dependent to the information received by the user equipment. According to the present invention, the measures taken by the user equipment in such a situation might include the application of the time limitation of the first discovery signal and/or the first discovery signal comprising a synchronization indication, wherein the synchronization indication is related to an estimated timer deviation of a timer within the user equipment with respect to the master timing schedule of the base station entity.

Thus, it is preferred according to the present invention that the time limitation of the first discovery signal corresponds to avoiding a first part and a second part of the discovery time interval, the first part of the discovery time interval including the beginning of the discovery time interval and the second part of the discovery time interval including the end of the discovery time interval.

Thereby, it is advantageously possible according to the present invention that by concentrating the first discovery signal on the middle part of the discovery time interval (i.e. avoiding the beginning of the discovery time interval—the first part thereof—and also avoiding the end of the discovery time interval—the second part thereof), a moderate time deviation of the internal timing base of the user equipment with regard to the master timing schedule will result in the relay user equipment receiving the first discovery signal (despite the mentioned time deviation).

Furthermore, it is preferred according to the present invention that the synchronization indication corresponds to at least one out of the following:
   an indication of a possible timing error as an explicit time error interval,
   an indication of a possible timing error as a fraction of a predetermined time interval,
   an indication of a possible timing error that can be part of different ranges.

Thereby, it is advantageously possible according to the present invention that even cases of a more important timing deviation of a timer within the user equipment with respect to the master timing schedule of the base station entity can be handled.

Based on the measures taken by the user equipment, i.e. the one of the two user equipments that has lost radio coverage to the mobile communication network, the likelihood of a discovery procedure being successfully conducted can be enhanced. This likelihood is still further enhanced by the relay user equipment modifying its reception behaviour (i.e. applying reception capabilities during the first reception time interval, the first reception time interval being an enlarged time interval, comprising but exceeding the discovery time interval in time) upon the reception of the first discovery signal from the user equipment, at least in case that the first discovery signal comprises the synchronization indication.

Additionally, in case that the discovery procedure is initiated by the relay user equipment, in the third step (which is performed independently from the first and/or second step),
   the relay user equipment is informing the user equipment of the common time base, i.e. the master timing schedule, by indicating, using the second discovery signal, the master timing schedule of the base station entity to the user equipment, and
   the user equipment is applying enlarged reception capabilities during the second reception time interval.

In typical cases, it can usually be assumed that the user equipment (which has lost network coverage at the second point in time) has had network contact (previously, at the first point in time) with the same base station entity than the base station entity on which the relay user equipment is camping (and has radio contact to). This means that during the period of the first point in time, also the user equipment is able to read the broadcast control channel of the respective base station entity, and hence the user equipment will be informed about the discovery time interval configured by this base station entity. A further typically valid assumption could be that the discovery time interval, i.e. the air interface resources that are indicated to be used by user equipments for discovery purposes are identical throughout the mobile communication network (or public land mobile network), i.e. for all the base station entities of the access network of the mobile communication network. In case this assumption is valid, it only needs to be assured that the user equipment (which is out of radio coverage at the second point in time) has had contact to one base station entity (out of the plurality of base station entities of the access network of the mobile communication network) once prior to the second point in time (in order to have had once the opportunity to read the respective broadcast control channel, including the indication of the discovery time interval), and, of course, to store an information indicative of the discovery time interval (relative to the master timing schedule) with the indication that this information is to be used even in case that the user equipment is out of coverage of the access network. Alternatively, a dedicated configuration could be defined that would be provided to a device to device communication enabled user equipment (e.g. user equipments enabled for public safety functionality), e.g. with the ATTACH Accept message or another NAS message (Non-Access Stratum message) or any Radio Resource Control (RRC) message, optionally with a timer information. Likewise with this alternative possibility of using the ATTACH Accept message or another NAS message or a Radio Resource Control (RRC) message, the information indicative of the discovery time interval should be stored in the user equipment with the indication that this information is to be used even in case that the user equipment is out of coverage of the access network. Still a further alternative possibility includes using Over The Air messages (OTA messages) in order to define a configuration information regarding the discovery time interval that would be provided to a device to device communication enabled user equipment with the provision that this configuration information (transmitted via an OTA message) is to be used in case that the user equipment is out of coverage with the radio network. Further alternatively this information may be configured into the device to device communication enabled user equipment by using configuration fields of an UICC (Universal Integrated Circuit Card) or this information can be stored as part of the terminal software.

It is furthermore advantageously possible according to the present invention that the first discovery signal and/or the second discovery signal is transmitted over the PC5 reference point between the user equipment and the relay user equipment.

Furthermore, the present invention relates to a user equipment adapted for having an improved radio coverage with respect to a mobile communication network, wherein the mobile communication network comprises a core network and an access network, wherein the access network of the telecommunications network comprises a base station entity, wherein the user equipment is enabled to use a device to device communication mode (D2D mode), wherein a relay user equipment is likewise enabled to use device to device communication mode, wherein the user equipment is configured to receive, from the base station entity, an indication related to a discovery time interval and a timing information related to a master timing schedule relevant for any user equipment being served by the base station entity, the discovery time interval being used for discovery signals exchanged between user equipments being enabled to use the device to device communication mode and using the device to device communication mode, wherein the user equipment is configured such that—in case that the relay user equipment is connected to the base station entity, and the user equipment is out of direct radio coverage with the base station entity—the user equipment transmits a first discovery signal, the first discovery signal comprising a time limitation with respect to the discovery time interval, and/or
  comprising a synchronization indication, the synchronization indication being related to an estimated timer deviation of a timer within the user equipment with respect to the master timing schedule of the base station entity.

Thereby, it is advantageously possible that the user equipment, despite having lost radio coverage to the mobile communication network or its respective base station entity, actively applies measures to improve the likelihood of a discovery procedure being successfully performed.

It is furthermore preferred according to the present invention—also with respect to the user equipment—that the time limitation of the first discovery signal corresponds to avoiding a first part and a second part of the discovery time interval, the first part of the discovery time interval including the beginning of the discovery time interval and the second part of the discovery time interval including the end of the discovery time interval.

Additionally, the present invention relates to a relay user equipment adapted for providing an improved radio coverage to a user equipment with respect to a mobile communication network, wherein the mobile communication network comprises a core network and an access network, wherein the access network of the telecommunications network comprises a base station entity, wherein both the relay user equipment and the user equipment are enabled to use a device to device communication mode (D2D mode), wherein the relay user equipment is configured to receive, from the base station entity, an indication related to a discovery time interval and a timing information related to a master timing schedule relevant for any user equipment being served by the base station entity, the discovery time interval being used for discovery signals exchanged between user equipments being enabled to use the device to device communication mode and using the device to device communication mode, wherein—in case that the relay user equipment is connected to the base station entity, and the user equipment is out of direct radio coverage with the base station entity—the relay user equipment is configured such that upon reception of a first discovery signal, wherein the first discovery signal either comprises a time limitation with respect to the discovery time interval and/or comprises a synchronization indication, the synchronization indication being related to an estimated timer deviation of a timer within the user equipment with respect to the master timing schedule of the base station entity, the relay user equipment applies reception capabilities during a first reception time interval, the first reception time interval comprising but exceeding the discovery time interval in time, wherein the first reception time interval is dependent on the time limitation and/or the synchronization indication of the first discovery signal, and/or
  a second discovery signal is transmitted by the relay user equipment, the second discovery signal indicating the master timing schedule of the base station entity.

The user equipment and the relay user equipment advantageously provide the possibility that the chances of a discovery procedure between these user equipments are enhanced.

It is furthermore preferred according to the present invention—both with respect to exemplary embodiments of the user equipment and with respect to exemplary embodiments of the relay user equipment that the synchronization indication corresponds to at least one out of the following:

an indication of a possible timing error as an explicit time error interval, an indication of a possible timing error as a fraction of predetermined time interval, an indication of a possible timing error that can be part of different ranges.

Additionally, the present invention relates to a system for improving or enabling radio coverage for a user equipment with respect to a mobile communication network, the system comprising the mobile communication network, the user equipment, and a relay user equipment, wherein the mobile communication network comprises a core network and an access network, wherein the access network of the telecommunications network comprises a base station entity, wherein the user equipment is enabled to use a device to device communication mode (D2D mode), wherein the relay user equipment is likewise enabled to use device to device communication mode, wherein the base station entity is configured to transmit a timing information related to a master timing schedule relevant for any user equipment being served by the base station entity, wherein the base station entity is furthermore configured to transmit an indication related to a discovery time interval, the discovery time interval being used for discovery signals exchanged between user equipments being enabled to use the device to device communication mode and using the device to device communication mode, wherein in case that the relay user equipment is connected to the base station entity, and in case that the user equipment—at a given point in time—has been connected to the base station entity or to another base station entity of the access network of the mobile communication network but is out of direct radio coverage with the base station entity at a further point in time, the further point in time being subsequent to the given point in time, the system and its components are configured such that:

the user equipment transmits a first discovery signal, the first discovery signal being received by the relay user equipment and the first discovery signal comprising a time limitation with respect to the discovery time interval, and/or comprising a synchronization indication, the synchronization indication being related to an estimated timer deviation of a timer within the user equipment with respect to the master timing schedule of the base station entity, the relay user equipment—upon reception of the first discovery signal from the user equipment—applies reception capabilities during a first reception time interval, the first reception time interval comprising but exceeding the discovery time interval in time, wherein the first reception time interval is dependent on the time limitation and/or the synchronization the relay user equipment transmits a second discovery signal, the second discovery signal indicating the master timing schedule of the base station entity to the user equipment, and the user equipment applies reception capabilities during a second reception time interval, the second reception time interval comprising but exceeding the discovery time interval in time, wherein the second reception time interval is related to an estimated timer deviation of a timer within the user equipment with respect to the master timing schedule of the base station entity.

Thereby, it is advantageously possible that the system components, despite the user equipment having lost radio coverage to the mobile communication network, applying measures to improve the likelihood of a discovery procedure between the user equipment and the relay user equipment being successfully performed.

Furthermore, the present invention is also related to a mobile communication network for use with exemplary embodiments of the invention.

Additionally, the present invention relates to a program comprising a computer readable program code which, when executed on a computer or on a user equipment or on a relay user equipment or a base station entity, or in part on the user equipment and in part on the relay user equipment, causes the computer or the user equipment or the relay user equipment or the base station entity to perform exemplary embodiments of the invention.

Still additionally, the present invention relates to computer program product for using a user equipment with a base transceiver station, the computer program product comprising a computer program stored on a storage medium, the computer program comprising program code which, when executed on a computer or on a user equipment or on a relay user equipment or a base station entity, or in part on the user equipment and in part on the relay user equipment, causes the computer or the user equipment or the relay user equipment or the base station entity to perform exemplary embodiments of the invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
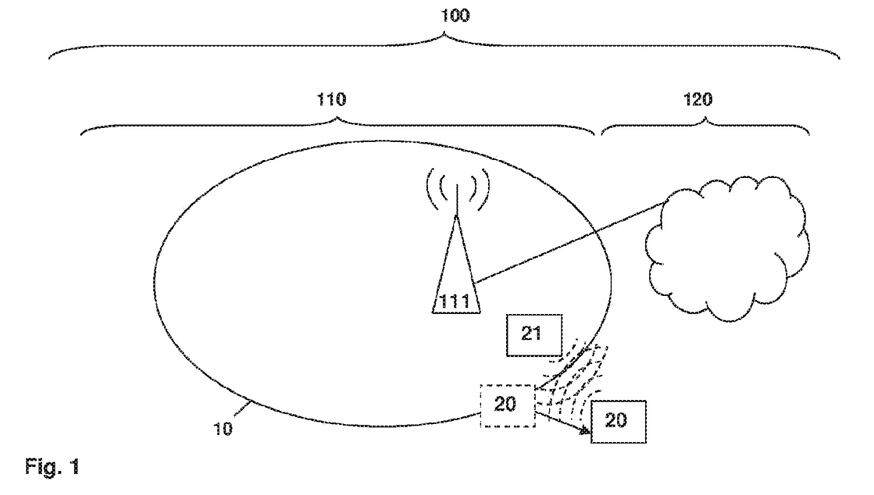
FIG. 1 schematically illustrates a mobile communication network that is enabled for allowing user equipments, camping on the mobile communication network, especially a public land mobile network, the possibility to conduct device to device communication.

In FIG. 1, a mobile communication network 100, especially a public land mobile network 100, is schematically shown, the mobile communication network 100 comprising an access network 110 and a core network 120. The mobile communication network 100 is preferably a cellular telecommunications network comprising typically a plurality of network cells (or radio cells), one of which is represented in FIG. 1 by means of a drawn-through circular line and reference sign 10. Typically, a base station entity 111 (or eNodeB or enhanced NodeB) is assigned to each network cell 10, the base station entity 111 being part of the access network 110 of the mobile communication network 100. In the mobile communication network 100, typically a plurality of user equipments are camping on the mobile communication network 100. Representative for the plurality of user equipments within the network cell (or radio cell) 10, a first user equipment 20 and a second user equipment 21 are schematically shown. In a first point in time, the first user equipment 20 is located within the radio coverage area of the network cell 10 (in this case the first user equipment 20 being represented by a dashed line and reference sign 20). In a second point in time, subsequent to the first point in time, the first user equipment 20 is outside of the radio coverage area of the network cell 10. The second user equipment 21 always stays within radio coverage are of the network cell 10. Both the first and the second user equipment 20, 21 are device to device communication enabled user equipments, i.e. they are capable of establishing a direct communication link between them. The establishment of the device to device communication link between the first and second user equipment 20, 21 is rendered more difficult in case that the first user equipment 20 is out of coverage of the network cell 10, compared to the case that both user equipments 20, 21 are located within radio coverage of the network cell 10. However, according to the present invention, the establishment of a device to device communication link between the user equipments 20, 21 is facilitated, thus providing at least relayed network coverage also to the first user equipment 20—via the direct communication link between the two user equipments 20, 21 via device to device communication. In this situation, the second user equipment 21 acts as a relay user equipment 21 for the first user equipment 20. Hereinafter, the term "user equipment 20" is used for the first user equipment 20 and the term "relay user equipment 21" is used for the second user equipment 21.

Figure 2:
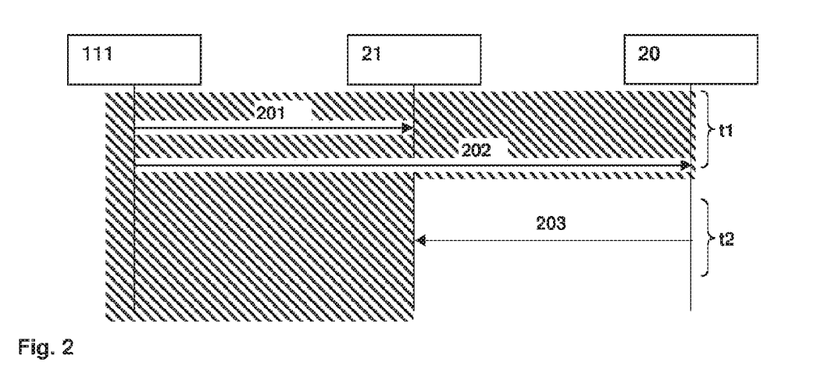
FIGS. 2 and 3 schematically illustrate communication diagrams between a base station entity, a user equipment and a relay user equipment according to the present invention.
Figure 3:
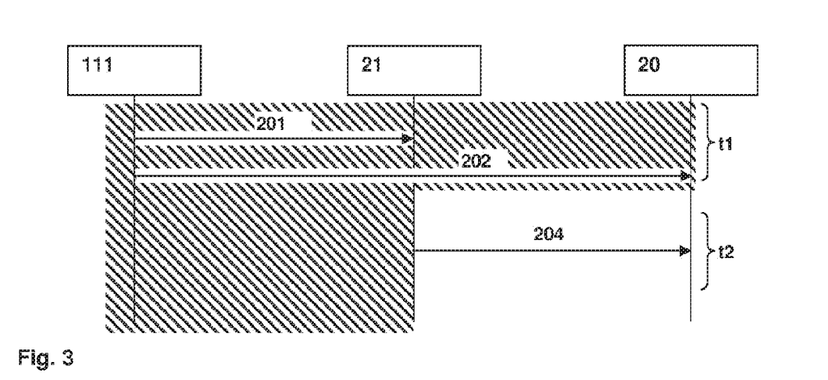

In FIGS. 2 and 3, communication diagrams between the base station entity 111, the user equipment 20 and the relay user equipment 21 are schematically shown. According both to FIG. 2 and FIG. 3, at a first point in time t1, the base station entity 111 transmits first control data 201 to the relay user equipment 21, and second control data 202 to the user equipment 20. The first and second control data 201, 202 comprise control information, e.g., regarding the configuration of the air interface between the base station entity 112 and the user equipments 20, 21. The first and second control data especially comprises a timing information related to a master timing schedule relevant for any user equipment being served by the base station entity 111. Furthermore, the first and second control data comprises an indication related to a discovery time interval 301 (cf. FIGS. 4 and 5), the discovery time interval being used for discovery signals exchanged between user equipments being enabled to use the device to device communication mode and using the device to device communication mode, i.e. the relay user equipment 21 and the user equipment 20. The discovery time interval 301 is transmitted by the base station entity 111 towards the user equipments 20, 21 and corresponds to the air interface resources dedicated by the base station entity 111 to discovery purposes between user equipments that are enabled for device to device communication. At a second point in time t2, indicated both in FIG. 2 and FIG. 3, the user equipment 20 has no radio coverage any more (indicated by a hatched area with regard to reference sign t1, and a hatched area extending only between the base station entity 111 and the relay user equipment 21 (and excluding the user equipment 20) at the second point in time t2). At the second point in time t2, a discovery procedure is initiated between the relay user equipment 21 and the user equipment 20. In FIG. 2, the discovery procedure is initiated by the user equipment 20, via a first discovery signal 203 being transmitted by the user equipment 20 towards the relay user equipment 21. In FIG. 3, the discovery procedure is initiated by the relay user equipment 21, via a second discovery signal 204 being transmitted by the relay user equipment 21 towards the user equipment 20.

Figure 4:
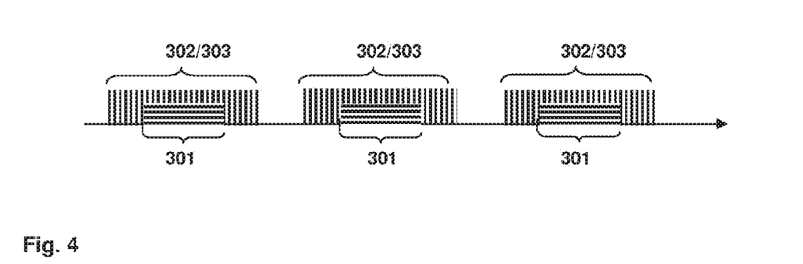
FIG. 4 schematically illustrates a representation of a first or second reception time interval with respect to a discovery time interval according to the present invention.

According to the present invention, in reaction to receiving the first discovery signal 203 from the user equipment 20 (the first discovery signal 203 especially comprising the synchronization indication), the relay user equipment 21 applies reception capabilities during an enlarged time interval compared to the normal situation (at least without the synchronization indication), the enlarged time interval (i.e. reception time) is—in the context of the present invention—called the first reception time interval 302, wherein the first reception time interval 302 comprises the discovery time interval 301 and exceeds it. Likewise, the user equipment 20 applies reception capabilities during an enlarged time interval compared to the normal situation, the enlarged time interval (i.e. reception time) is—in the context of the present invention—called the second reception time interval 303, wherein the second reception time interval 303 comprises the discovery time interval 301 and exceeds it. The enlargement (in time) of both the first reception time interval 302 and the second reception time interval 303 is represented in FIG. 4.

Figure 5:
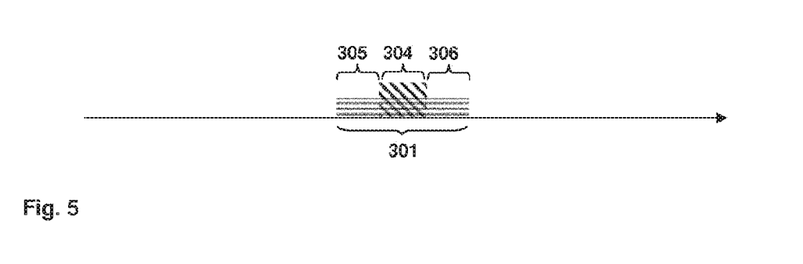
FIG. 5 schematically illustrates a representation of a time limitation of the discovery time interval according to the present invention.

In FIG. 5, a representation of a time limitation of the discovery time interval 301 according to the present invention is schematically shown. The user equipment 20 avoids to use the complete time span of the discovery time interval 301 but uses only the middle part of it such that a first part 305 and a second part 306 of the discovery time interval 301 is avoided, wherein the first part 305 of the discovery time interval 301 includes the beginning of the discovery time interval 301 and the second part 306 of the discovery time interval 301 includes the end of the discovery time interval 301.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for improving or enabling radio coverage for a user equipment with respect to a mobile communication network, wherein the mobile communication network comprises a core network and an access network, wherein the access network of the mobile communication network comprises a base station entity, wherein the user equipment is enabled to use a device to device communication mode (D2D mode), wherein a relay user equipment is also enabled to use a D2D mode, wherein the base station entity transmits a timing information related to a master timing schedule relevant for any user equipment being served by the base station entity, wherein the base station entity furthermore transmits an indication related to a default discovery time interval, the default discovery time interval being usable for discovery signals exchanged between user equipments using the D2D mode, wherein the relay user equipment is connected to the base station entity, and wherein the user equipment at a first point in time was connected to the base station entity or to another base station entity of the access network of the mobile communication network, and, at a second, subsequent point in time, is out of direct radio coverage of the base station entity, wherein the method comprises:
receiving, by the relay user equipment in a first step, a first discovery signal from the user equipment while the user equipment is out of direct radio coverage of the base station entity, wherein the first discovery signal comprises a time limitation with respect to the default discovery time interval; and
applying, by the relay user equipment in a second step subsequent to the first step and in response to reception of the first discovery signal from the user equipment, reception capabilities during an enlarged reception time interval relative to the default discovery time interval, the enlarged reception time interval comprising and exceeding the default discovery time interval in time, wherein the enlarged reception time interval is subject to the time limitation of the first discovery signal;
wherein the time limitation of the first discovery signal corresponds to avoiding a first part and a second part of the default discovery time interval, the first part of the default discovery time interval including the beginning of the default discovery time interval and the second part of the default discovery time interval including the end of the default discovery time interval.

2. The method according to claim 1, wherein the first discovery signal is transmitted over a PC5 reference point between the user equipment and the relay user equipment.

3. A system, comprising:
a mobile communication network, wherein the mobile communication network comprises a core network and an access network, wherein the access network of the mobile communication network comprises a base station entity;
a user equipment, wherein the user equipment is configured to:
use a device to device communication mode (D2D mode);
receive, from the base station entity, an indication related to a default discovery time interval and timing information related to a master timing schedule relevant for any user equipment being served by the base station entity, the default discovery time interval being usable for discovery signals exchanged between user equipments using the D2D mode; and
transmit, while the user equipment is out of direct radio coverage of the base station entity, a first discovery signal to a relay user equipment connected to the base station entity and enabled to use the D2D mode, wherein the first discovery signal comprises a time limitation with respect to the default discovery time interval and/or comprises a synchronization indication, the synchronization indication being related to an estimated timer deviation of a timer within the user equipment with respect to the master timing schedule of the base station entity; and
the relay user equipment, wherein the relay user equipment is configured to apply, in response to reception of the first discovery signal from the user equipment, reception capabilities during an enlarged reception time interval relative to the default discovery time interval, the enlarged reception time interval comprising and exceeding the default discovery time interval in time, wherein the enlarged reception time interval is subject to the time limitation of the first discovery signal and/or dependent on the synchronization indication of the first discovery signal;
wherein the time limitation of the first discovery signal corresponds to avoiding a first part and a second part of the default discovery time interval, the first part of the default discovery time interval including the beginning of the default discovery time interval and the second part of the default discovery time interval including the end of the default discovery time interval.

4. A relay user equipment, comprising:
a processor; and
a non-transitory computer-readable medium having processor-executable instructions stored thereon;
wherein the processor is configured, based on executing the processor-executable instructions stored on the non-transitory computer-readable medium, to facilitate:
receiving, in a first step, a first discovery signal from a user equipment while the user equipment is out of direct radio coverage of a base station entity, wherein the first discovery signal comprises a time limitation with respect to a default discovery time interval; and
applying, in a second step subsequent to the first step and in response to reception of the first discovery signal from the user equipment, reception capabilities during an enlarged reception time interval relative to the default discovery time interval, the enlarged reception time interval comprising and exceeding the default discovery time interval in time, wherein the enlarged reception time interval is subject to the time limitation of the first discovery signal;
wherein the time limitation of the first discovery signal corresponds to avoiding a first part and a second part of the default discovery time interval, the first part of the default discovery time interval including the beginning of the default discovery time interval and the second part of the default discovery time interval including the end of the default discovery time interval.

5. One or more non-transitory computer-readable media having processor-executable instructions stored thereon for improving or enabling radio coverage for a user equipment with respect to a mobile communication network, wherein the mobile communication network comprises a core network and an access network, wherein the access network of the mobile communication network comprises a base station entity, wherein the user equipment is enabled to use a device to device communication mode (D2D mode), wherein a relay user equipment is also enabled to use a D2D mode, wherein the base station entity transmits a timing information related to a master timing schedule relevant for any user equipment being served by the base station entity, wherein the base station entity furthermore transmits an indication related to a default discovery time interval, the default discovery time interval being usable for discovery signals exchanged between user equipments using the D2D mode, wherein the relay user equipment is connected to the base station entity, and wherein the user equipment at a first point in time was connected to the base station entity or to another base station entity of the access network of the mobile communication network, and, at a second, subsequent point in time, is out of direct radio coverage of the base station entity, wherein the processor-executable instructions, when executed, facilitates performance of:

receiving, by the relay user equipment in a first step, a first discovery signal from the user equipment while the user equipment is out of direct radio coverage of the base station entity, wherein the first discovery signal comprises a time limitation with respect to the default discovery time interval; and applying, by the relay user equipment in a second step subsequent to the first step and in response to reception of the first discovery signal from the user equipment, reception capabilities during an enlarged reception time interval relative to the default discovery time interval, the enlarged reception time interval comprising and exceeding the default discovery time interval in time, wherein the enlarged reception time interval is subject to the time limitation of the first discovery signal;

wherein the time limitation of the first discovery signal corresponds to avoiding a first part and a second part of the default discovery time interval, the first part of the default discovery time interval including the beginning of the default discovery time interval and the second part of the default discovery time interval including the end of the default discovery time interval.

6. A method for improving or enabling radio coverage for a user equipment with respect to a mobile communication network, wherein the mobile communication network comprises a core network and an access network, wherein the access network of the mobile communication network comprises a base station entity, wherein the user equipment is enabled to use a device to device communication mode (D2D mode), wherein a relay user equipment is also enabled to use a D2D mode, wherein the base station entity transmits a timing information related to a master timing schedule relevant for any user equipment being served by the base station entity, wherein the base station entity furthermore transmits an indication related to a default discovery time interval, the default discovery time interval being usable for discovery signals exchanged between user equipments using the D2D mode, wherein the relay user equipment is connected to the base station entity, and wherein the user equipment at a first point in time was connected to the base station entity or to another base station entity of the access network of the mobile communication network, and, at a second, subsequent point in time, is out of direct radio coverage of the base station entity, wherein the method comprises:

receiving, by the relay user equipment in a first step, a first discovery signal from the user equipment while the user equipment is out of direct radio coverage of the base station entity, wherein the first discovery signal comprises a synchronization indication related to an estimated timer deviation of a timer within the user equipment with respect to the master timing schedule of the base station entity; and applying, by the relay user equipment in a second step subsequent to the first step and in response to reception of the first discovery signal from the user equipment, reception capabilities during an enlarged reception time interval relative to the default discovery time interval, the enlarged reception time interval comprising and exceeding the default discovery time interval in time, wherein the enlarged reception time interval is dependent on the synchronization indication of the default discovery signal.

7. The method according to claim 6, wherein the synchronization indication corresponds to at least one out of the following:

an indication of a possible timing error as an explicit time error interval, an indication of a possible timing error as a fraction of a predetermined time interval, an indication of a possible timing error that can be part of different ranges.

* * * * *